April 14, 1953     G. W. CAYLOR     2,634,842
SELF-CLEANING DEADBOX
Filed Sept. 11, 1947     2 SHEETS—SHEET 1

INVENTOR
GEORGE W. CAYLOR
BY William C. Babcock
ATTY.

April 14, 1953  G. W. CAYLOR  2,634,842
SELF-CLEANING DEADBOX
Filed Sept. 11, 1947  2 SHEETS—SHEET 2
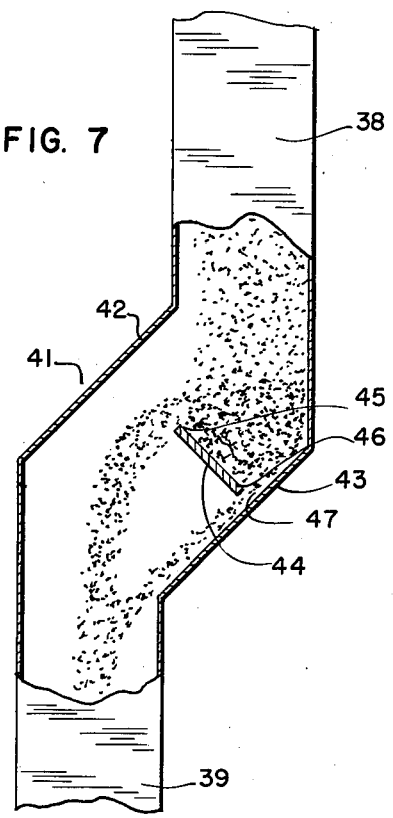
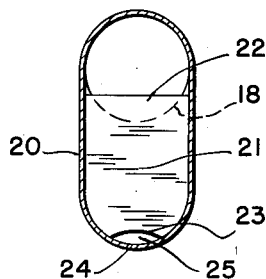
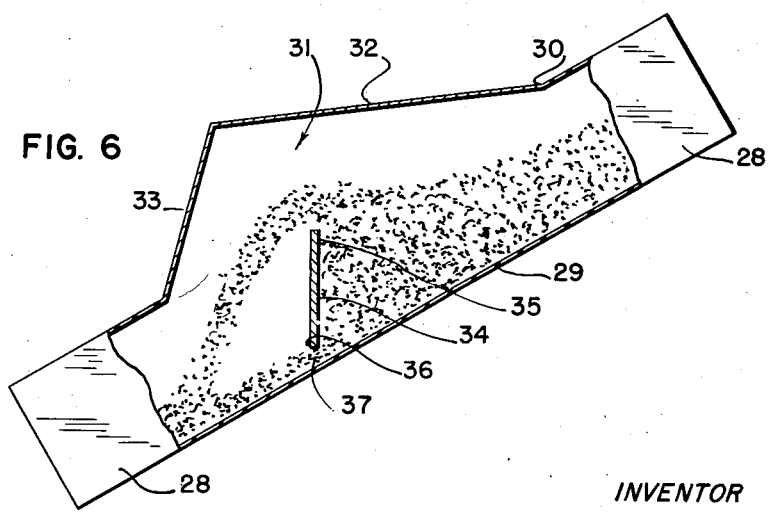
INVENTOR
GEORGE W. CAYLOR
BY William C. Babcock
ATTY.

Patented Apr. 14, 1953

2,634,842

UNITED STATES PATENT OFFICE 2,634,842

SELF-CLEANING DEADBOX

George W. Caylor, Buffalo, N. Y., assignor to General Mills, Inc., a corporation of Delaware Application September 11, 1947, Serial No. 773,361

15 Claims. (Cl. 193—32)

This application relates to a retarder for gravity chutes. This retarder is generally useful in connection with the passage of granular or free flowing materials such as grain, cereal products, sand and similar abrasive materials through such a chute. Such retarders are sometimes referred to as deadboxes.

In any installation where materials of the type described are carried through a considerable vertical distance by a gravity chute, the individual particles of material acquire relatively high velocities and tend to abrade or wear the surface of whatever apparatus may be at the lower end of the chute. It is therefore customary to provide some means for arresting the movement of materials through such a chute at intervals therein particularly just before such materials enter another apparatus, such as a milling machine. In many previous constructions of this type a baffle has been placed in the chute which causes the material to pile up against the baffle and then overflow the upper edges of such baffle and continue down the chute. In other cases the chute empties into the top of one end of a flat-bottomed box and is discharged from the bottom of the opposite end of the box, after a pile of material has accumulated within the box. Such a baffle or box usually collects a pocket of the material in question and unless some means is provided for cleaning the material from the pocket, the material so retained remains in the chute indefinitely. This situation is undesirable, particularly in connection with milling and food handling installations, where infestation may set in wherever a mass of such material is left in place for a considerable time.

Some of the deadboxes previously known have been provided with hand holes or openings through which the accumulated material could be removed periodically. The necessity of such periodic cleaning, however, requires the expenditure of considerable time and effort by operators of the installation. Furthermore, if the baffle is so arranged that it does not collect a pocket of the material, as in the case of alternate inclined plates which cause a zig-zag movement of material, the material will strike the baffle plates directly and cause both abrasion of the plates and damage to the particles of material.

With these defects of the prior art in view, it is accordingly one object of the present invention to provide a retarder for a gravity chute, in which an improved baffle member is provided to slow the progress of material through the chute.

It is a further object to provide such a baffle which will intercept the material in the chute and collect a pocket of such material to form a cushion which will slow the flow of succeeding material in the chute.

It is still another object of the invention to provide a baffle member which will retain a portion of the material as a cushion to arrest the flow of falling material and which shall include automatic drainage means permitting gradual passage of the retained material to the lower portion of the chute at a rate substantially less than the normal rate of flow of materials in the chute.

Other objects and advantages will be apparent from the following specification in which several embodiments of the invention are described with particular reference to the accompanying drawings.

In these drawings wherein like reference characters indicate like parts,

Fig. 5 is a sectional view on the line 5—5 of Fig. 4.

Fig. 6 is a view, similar to Fig. 4, of still another embodiment of the invention in connection with an inclined chute of rectangular cross section, and Fig. 7 is a view, similar to Fig. 1, of a retarder according to this invention incorporated in an offset vertical chute of rectangular cross section.

Figure 1:
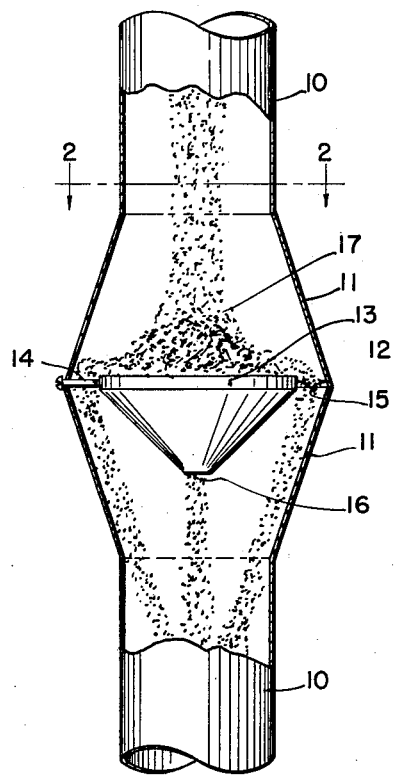
Figure 1 is a side elevation of a vertical chute embodying a retarder according to the present invention, with certain portions of the figure broken away for the sake of clearness.
Figure 2:
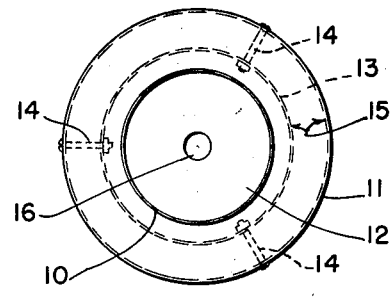
Figure 2 is a sectional view on the line 2—2 of Fig. 1.
Figure 3:
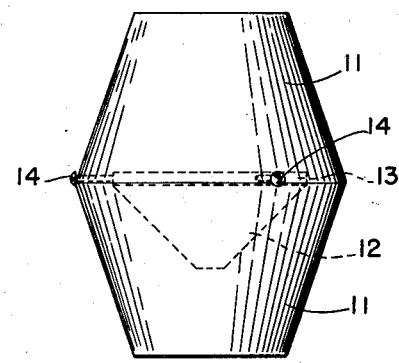
Fig. 3 is a side elevation similar to Fig. 1 showing details of the mounting of the retarder according to this embodiment of the invention.

With reference to Figs. 1, 2 and 3, I have shown a vertical chute 10 of substantially circular cross section which is designed to convey materials downwardly through the action of gravity. While I shall describe devices of the present invention in connection with grain and cereal products, it will be understood that this invention is applicable in connection with any materials of similar abrasive nature for which conveyors or chutes of this general type are customarily employed.

The vertical chute 10 is provided with an enlarged portion formed by two partial conical sections 11. These sections provide a portion of enlarged diameter in the chute in which a baffle member according to this invention is mounted. The particular baffle member shown in the figure is in the form of a funnel-like member 12 having a circular upper vertical edge 13. The diameter of this upper circular edge is at least as great as the diameter of the upper portion of conduit 10 in order that any materials which drop through the chute will fall within the area defined by the upper circular edge 13 of the baffle member.

The baffle member is supported within the enlarged portion of the chute by means of a series of bolts 14 so that there is an annular space 15 surrounding the baffle member between the upper edge of said member and the walls of said enlarged portion. The total size of this annular area should be adequate to accommodate the greatest volume of material per unit of time which the chute is expected to handle.

It will be apparent from Fig. 1 that material which drops downwardly through the chute 10 will fall within the funnel-like baffle member 12 and will tend to accumulate therein. This material will pile up above the baffle member as indicated at 17, the slope of the pile being determined by known factors, i. e., primarily by the angle of repose of the particular material. Once the material has collected on the baffle member 12 it will serve as a cushion against which succeeding particles of material strike as they come down chute 10. These later particles will thus strike the material retained by baffle member 12 and their downward motion will be arrested. However, since the materials conveyed by such a chute are substantially free flowing these succeeding particles, after they are momentarily arrested by contact with the retained material at 17, will then slide down the edges of the retained pile of material and will overflow the upper edge 13 of the baffle member, passing through the annular space 15 and on down the chute. It will be noted, however, that, in effect, the material has been stopped at this point so that it flows down the lower portion of chute 10 at a slower rate, just as if it had initially started from the level of the baffle member. Thus if a milling machine or other apparatus is connected to the chute just below the baffle member it will be apparent that the material will fall gently into such apparatus and will not cause undue wear or abrasion of it.

It should also be noted that the baffle member itself is protected from wear by virtue of the fact that once a certain amount of material has been collected by it, the succeeding portions of material do not strike the baffle member directly but impinge upon the particles of retained material which thus serve as a cushion for the particles which arrive later. Furthermore the individual grains or particles of material are less likely to be broken or damaged, since they strike a pile of similar particles rather than a solid and unyielding baffle member.

According to the present invention, I provide means for slow continuous drainage of the retained material from said baffle member 12. For this purpose the funnel-like baffle member 12 is provided with a lower opening 16. The size of this opening is relatively small and is so chosen that it is substantially smaller than the size of opening which would be required for passage of the lowest volume of material per unit time which the chute is expected to handle. Thus, although some of the material will pass through the opening 16, this opening will be inadequate to accommodate any substantial portion of the conveyed particles. The material will accordingly accumulate in the funnel-like member as described above and will ultimately overflow the upper edge 13 of said member. In other words, once the operation of the chute has been started, the material retained by baffle 12 will cause most of the succeeding material to be arrested and to overflow the edge 13 through annular space 15. Meanwhile a relatively small proportion of the material retained by the baffle will be permitted to leak downwardly through opening 16 to the lower portion of chute 10.

The importance of opening 16 will be apparent. For example, if the chute is in continuous operation, the opening 16 insures a slow but steady drainage of the retained material so that the material thus retained is gradually released to the lower portions of the chute and can be replaced by fresh materials. Furthermore, if the use of the chute is discontinued for any reason so that no further material passes down the chute 10 against the baffle member and its retained material, the drainage opening 16 will gradually permit the material in the baffle to pass downwardly through the chute until the baffle member is entirely clean. Thus, in the case of a mill chute, none of the grain or cereal product will remain in the baffle member 12 or in the enlarged portion 11 of the chute where it might be subject to infestation and where it might adversely affect materials which are subsequently passed through the chute. In other words, I have provided a baffle member which serves two important functions in that it collects a sufficient portion of material to serve as a cushion for succeeding particles of material and which at the same time is self-cleaning, so that no particles of the material will be left in the chute after the operation is discontinued.

Figure 4:
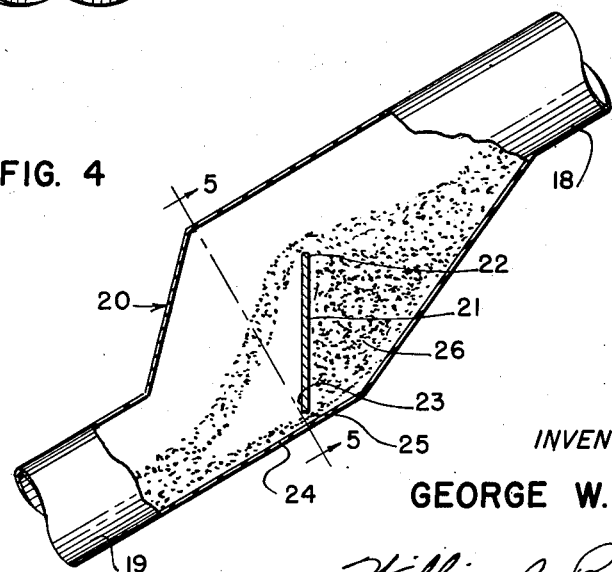
Fig. 4 is a side elevation with certain portions broken away, of an inclined chute which includes a baffle member according to this invention.

In Fig. 4 another embodiment of the invention has been shown in connection with an inclined chute, as distinguished from the vertical chute of Figs. 1, 2 and 3. Thus as shown in Fig. 4 the material is conveyed down to the retarder by an inclined chute 18 of circular cross section. After passing the retarder or deadbox, the material then continues to pass downwardly through the lower chute portion 19. It will be noted that chute portion 19 is downwardly offset with respect to the upper portion 18 of the chute. These two chute portions 18 and 19 are connected by an enlarged inclined portion designated generally as 20. This enlarged portion serves as a deadbox in which a baffle member 21 may be mounted. Baffle 21 extends across the lower section of this enlarged portion so as to intercept the material flowing from the upper chute 18 and collect a pocket of such material as shown at 26 to serve as a cushion for succeeding material which flows down the chute. This pocket or cushion is struck by the later particles of material and causes such particles to slow down before they overflow the upper edge 22 of baffle 21. After overflowing the upper edge of the baffle, the material then continues down the lower chute 19 at a reduced rate of flow. This would permit the connection of a milling apparatus or other device to chute 19 just below the deadbox.

In this case as shown in Figs. 4 and 5, the lower edge 23 of the baffle 21 is spaced slightly from the bottom wall 24 of the enlarged portion 20 to form a small drainage opening 25. Just as in the device of Figs. 1 to 3, the size of this opening is so small that it is unable to accommodate any substantial part of the material which flows through the passage 18 in a given unit of time. However, a small portion of the retained material 26 passes constantly through opening 25 to the lower chute 19 and thus serves to drain the pocket of accumulated material 26 in the event that operation of the chute is discontinued. This automatic cleaning of the deadbox makes it unnecessary to provide an opening for external cleaning or to allot specific personnel to the task of periodic cleaning of the retarder.

In Fig. 6 I have shown another modification of the invention in connection with an inclined chute 28 of rectangular cross section. In this case, the bottom wall is continuous and straight so that the upper and lower portions of the chute are not offset from each other as in the device of Figs. 4 and 5. Here the enlarged portion 31 in the chute is formed by outwardly diverging sections 32 and 33 of the upper wall of the chute. A vertical baffle member 34 is positioned across the lower part of the intermediate portion 31 of the chute and serves to collect a pocket of material just as in the previous cases, to serve as a cushion for arresting the progress of material down the chute and requiring such material to overflow the upper edge 35 of baffle 34.

Here again the lower edge 36 of baffle 34 is spaced slightly from bottom wall 29 of the chute in order to provide a relatively small, self-cleaning drainage opening 37 through which the material retained by the baffle may gradually be emptied when operation of the chute stops. It will be apparent, of course, that this drainage action through opening 37 will take place continuously during operation of the chute. However, since opening 37 is too small to permit passage of the volume of material per unit time accommodated by the rest of the chute, the presence of this opening will not interfere with the function of the baffle in collecting a pocket of material to serve as a cushion for slowing the flow of the remaining material in the chute.

It will be understood that the height of the baffle 34 must be so chosen with reference to the diameter of chute 28 and the angle of inclination of the chute that the material collected behind the baffle will not block completely the upper portion of the chute. In other words, it is essential that the upper edge 35 of the baffle be sufficiently lower than the junction point 30 between the enlarged portion 31 and the upper chute 28 to provide space between junction 30 and the upper surface of the accumulated material after the pocket of such material has collected with its upper surface defined by the angle of repose of the particular product.

In Fig. 7 still another embodiment of the invention has been shown. In this case a retarder according to the invention has been used in connection with the offset upper and lower vertical chutes 38 and 39 respectively. These offset vertical chutes are connected by an inclined intermediate portion 41 having a top wall 42 and a bottom wall 43 spaced further apart than the corresponding walls of chutes 38 and 39. The baffle member 34 is positioned across the lower portion of the inclined connecting portion 41 as shown in the figure and it will be noted that the upper edge 45 of the baffle extends sufficiently far to the left in the figure to intercept any material falling down the left hand side of upper chute portion 38. Thus baffle 44, in cooperation with bottom wall 43 of inclined portion 41 will intercept and retain a portion of the material flowing down the chute 38 and this retained material will serve as a cushion and stop to arrest the flow of succeeding particles of material and compel them to overflow the upper edge 45 of baffle 44. This overflowing material will pass through the space between said edge 45 and upper wall 42 of portion 41. Thus again the material falling through the chute will be slowed by striking against a pile of similar material before the particles pass to the lower chute 39.

The lower edge 46 of the baffle 44 is spaced slightly from bottom wall 43 of intermediate connecting portion 41 to provide a small drainage opening for the material retained by the baffle. The size and function of opening 47 will of course be similar to that described in connection with the previous embodiments of the invention and need not be elaborated at this point.

It will therefore be apparent that I have provided a deadbox or retarder for gravity chutes in which a baffle member intercepts the flow of material passing down the chute and retains a portion of such material to serve as a cushion against which the remaining particles of material may strike. These remaining particles of material are thus slowed in their downward descent before they overflow the pocket of retained material to pass on down to the lower portions of the chute. Furthermore, in each case automatic drainage means have been provided for gradually and constantly cleaning the retained material out of the pocket so that there is a constant turnover of such material during operation of the chute and so that all the material will be removed from said pocket automatically when operation of the chute ceases.

Obviously the construction of the baffle members and the arrangement of the drainage means can be varied substantially from the specific forms shown and it is therefore my intention that all such variations as are readily apparent to those skilled in this art should be considered within the scope and spirit of the attached claims.

Now, therefore, I claim:

1. In combination, a gravity chute having a portion from which materials fall relatively freely at high individual velocity, and a retarder below said portion, said retarder comprising a baffle member constructed and located to provide an open-topped pocket in the path of material passing from said portion and thereby collect a cushion of such material in the pocket, the pocket having an area and location compelling substantially all of the material to strike the cushion of material previously accumulated therein, and said pocket having a small drainage opening at its bottom for continuous self-cleaning discharge of material from the pocket, the cross-sectional area of the drainage opening being substantially smaller than that required for passage of material at the lowest expected volume-rate of flow in said chute and said small drainage opening cross-sectional area thereby compelling the major portion of the material in the chute to overflow the pocket after such material is retarded by contact against the cushion of material previously collected in the pocket.

2. A steeply inclined gravity chute having an unobstructed portion through which materials fall relatively freely at high individual velocity, and a retarder in the chute below said unobstructed portion, said retarder comprising a baffle member constructed and located to provide an open-topped pocket in the path of material passing from said unobstructed portion, the pocket having an area and location compelling substantially all of the material to strike the pocket and the material previously accumulated therein, and said pocket having a small drainage opening at its bottom for continuous self-cleaning discharge of material from the pocket, the cross-sectional area of the drainage opening being substantially smaller than that required for passage of material at the lowest expected volume-rate of flow in said chute, and said small drainage opening cross-sectional area thereby compelling the major portion of the material in the chute to overflow the pocket, after such material is retracted by contact against material previously collected in the pocket.

3. A steeply-inclined gravity chute having an unobstructed portion through which materials fall relatively freely at high individual velocity, and a retarder at the bottom of said unobstructed portion, said retarder comprising a chute section of enlarged cross section, a baffle member in said section constructed and located to provide an open-topped pocket in the path of material passing from the chute portion to the enlarged section, the pocket having an area and location compelling substantially all of such material to strike the pocket and the material previously accumulated therein, the cross-sectional area of said section outside the pocket providing for overflow of material from the pocket at the maximum expected volume-rate of flow in said chute, and said pocket having a small drainage opening at its bottom for continuous self-cleaning discharge of material from the pocket, the cross-sectional area of said drainage opening being substantially smaller than that required for passage of material at the lowest expected volume-rate of flow in said chute and thereby compelling substantially all the material in the chute to overflow the pocket, after such material is retarded by contact against material previously collected in the pocket.

4. A retarder for a gravity chute having an enlarged intermediate portion, comprising an inverted cone-shaped baffle member supported in said chute with its upper circular edge inwardly spaced from the walls of said enlarged portion, said member having a small bottom opening for drainage of material from said member at a rate substantially less than the lowest normal rate of flow in said chute.

5. A retarder for a vertical circular gravity chute having an enlarged intermediate portion, comprising a funnel-like baffle member supported in said enlarged portion with its upper circular edge spaced inwardly from the walls of the enlarged portion and having a diameter at least as great as the diameter of said chute, said member having a bottom opening smaller than the area required for continuous passage of the lowest normal volume of material in the chute.

6. A retarder for an inclined gravity chute comprising a baffle extending across the lower portion of said chute to intercept the flow of material therein and retain a portion of said material as a cushion to slow the flow of the remaining material and require the majority of the later material to overflow the baffle, said baffle having its lowermost portion spaced slightly from the bottom of said chute and thereby providing a self-cleaning drainage opening of relatively small area for said retained material, the relatively small area of the drainage opening compelling the major portion of the material to overflow the top of the baffle after such material has been retarded by contact against said cushion.

7. A retarder according to claim 6, in which said baffle is positioned in an enlarged intermediate portion of said chute to facilitate said overflow.

8. A retarder according to claim 7, in which the part of the chute below said baffle is downwardly offset with reference to the part of the chute above the baffle.

9. A chute comprising upper and lower portions offset from each other, an inclined enlarged portion connecting said offset portions, and a baffle positioned in said inclined connecting portion to intercept the flow of material from said upper chute and retain a pocket of said material as a cushion to slow the flow of the remaining material and require the majority of such material to overflow said baffle, the lower edge of said baffle being spaced slightly from the bottom of said inclined connecting portion and thereby providing an opening of relatively small area for slow, continuous drainage of said retained material from said pocket, the relatively small area of said opening compelling the major portion of the material to overflow the top of the baffle after such material has been retarded by contact against said cushion.

10. A chute according to claim 9 in which said upper and lower chute portions are substantially vertical and are laterally offset from each other.

11. A chute according to claim 9 in which said upper and lower chute portions are substantially parallel and inclined, with the lower chute offset downwardly from the upper chute.

12. A retarder according to claim 2 in which the small drainage opening delivers material from the bottom of the pocket into a lower portion of the chute.

13. A retarder for gravity chutes comprising an open-topped receptacle mounted within the chute in the path of material falling down the chute for collection of material to form a cushion against which following material may strike, the receptacle being spaced from a wall of the chute and thereby providing a relatively large area through which the following material may overflow the cushion at a desired normal volume rate and said receptacle having a relatively small bottom opening for drainage of material from the receptacle at a substantially lower volume rate, the relatively small size of the bottom opening compelling the major portion of the material in the chute to overflow the top of the receptacle and cushion, after such material has been retarded by contact against such cushion.

14. The method of retarding the flow of material down a gravity chute which comprises collecting a pocket of the material to form a cushion large enough to intercept the subsequent material falling down the chute, delaying the later material by discharging it against the cushion and compelling it to overflow the pocket and cushion before continuing down the chute, and discharging material continuously from the bottom of the pocket at a volume rate substantially less than the lowest normal volume rate of flow of material down the chute.

15. The method of retarding the flow of material down a gravity chute which comprises collecting a pocket of the material large enough to form a cushion against which material subsequently falling down the chute may strike, compelling the subsequent material to overflow the pocket and cushion before continuing down the chute at the desired volume rate, and discharging material continuously from the bottom of the pocket at a substantially lower volume rate than that at which the material overflows the pocket.

GEORGE W. CAYLOR.

References Cited in the file of this patent

UNITED STATES PATENTS

| Number | Name | Date |
|---|---|---|
| 444,037 | Banks | Jan. 6, 1891 |
| 915,534 | Arnold | Mar. 16, 1909 |
| 1,035,871 | Gardner | Aug. 20, 1912 |
| 1,047,680 | Mills et al. | Dec. 17, 1912 |
| 1,784,650 | Adams | Dec. 9, 1930 |

FOREIGN PATENTS

| Number | Country | Date |
|---|---|---|
| 643,599 | Germany | Apr. 13, 1937 |